United States Patent
Moon et al.

[11] Patent Number: 6,035,070
[45] Date of Patent: Mar. 7, 2000

[54] ENCODER/DECODER FOR CODING/ DECODING GRAY SCALE SHAPE DATA AND METHOD THEREOF

[76] Inventors: Joo-Hee Moon, 602-304 Hyundai 3Cha APT, 610 Kuui 3-dong, Kwangjin-ku, Seoul; Ji-Heon Kweon, 90-156, Shillimbon-dong, Kwanak-ku, Seoul, both of Rep. of Korea

[21] Appl. No.: 08/936,778

[22] Filed: Sep. 24, 1997

[30] Foreign Application Priority Data

Sep. 24, 1996 [KR] Rep. of Korea .................. 96-41959

[51] Int. Cl.[7] .................................................. G06K 9/00
[52] U.S. Cl. .......................................... 382/243; 382/239
[58] Field of Search ................................. 382/166, 232, 382/233, 235, 236, 238, 239, 240, 241, 242, 243, 244, 248, 251, 252, 253, 224, 190, 209, 115; 345/431, 150, 186, 32; 359/640; 348/744, 760; 358/296, 298, 448, 464, 523, 530, 502, 520; 356/71; 364/736.5

[56] References Cited

U.S. PATENT DOCUMENTS

| | | | |
|---|---|---|---|
| Re. 35,657 | 11/1997 | Buckley et al. | 358/296 |
| 4,882,683 | 11/1989 | Rupp et al. | 364/521 |
| 4,965,751 | 10/1990 | Thayer et al. | 364/521 |
| 5,036,544 | 7/1991 | Sakave et al. | 382/242 |
| 5,510,910 | 4/1996 | Bockman et al. | 358/502 |
| 5,528,355 | 6/1996 | Maase et al. | 356/71 |
| 5,557,538 | 9/1996 | Retter et al. | 364/514 A |
| 5,592,228 | 1/1997 | Dachiku et al. | 382/241 |
| 5,592,405 | 1/1997 | Gove et al. | 364/749 |
| 5,602,679 | 2/1997 | Dolgoff et al. | 359/640 |
| 5,764,374 | 6/1998 | Seroussi et al. | 382/239 |
| 5,764,814 | 6/1998 | Chen et al. | 382/243 |
| 5,777,690 | 7/1998 | Takeda et al. | 382/236 |
| 5,883,632 | 3/1999 | Dillinger | 345/431 |

*Primary Examiner*—Bijan Tadayon

[57] ABSTRACT

Provided is a gray scale shape data encoder in shape data coding devices, including: video signal generating device for receiving a video signal, extracting and outputting shape data; transparency data extracting device for receiving the shape data from the shape data extracting device, extracting and outputting transparency data; boundary block merging device for receiving the transparency data output from the transparency data extracting device, performing a boundary block merging, and outputting the merged signal; transparency data coding device for receiving the transparency data merged in the boundary block merging device, coding and outputting them; supporting device for receiving the shape data from the shape data extracting device and extracting binary shape data; binary shape data coding device for receiving binary shape data from the supporting device, coding and outputting them; and binary shape data decoding device for receiving the coded binary shape data from the binary shape data decoding device, re-decoding them and outputting the reproduced binary shape data.

64 Claims, 11 Drawing Sheets

ENCODER/DECODER FOR CODING/DECODING GRAY SCALE SHAPE DATA AND METHOD THEREOF

BACKGROUND OF THE INVENTION

1. Field of the Invention

The present invention relates to a device and method for coding/decoding gray scale shape data and, more particularly, to a gray scale shape data encoder/decoder which divides a boundary macro block into sub-blocks and merges/splits each of the sub-blocks with respect to the proximity in length and the correlation, thereby encoding/decoding gray scale shape data.

2. Discussion of Related Art

In synthesizing multitude of images, each screen has luminance, chrominance and shape data. The shape data comprises binary shape data for representing a profile of an object, and transparency data for representing the weight of each of the pixels forming the screen.

An image is split into a grid of 16×16 macro blocks. Therefore, the split blocks are rearranged to code the image as illustrated in FIG. 1. The image is divided into a region having no object image data and other region having the object image data. The region is split into macro blocks 13 having only image data(hereinafter, it is referred to as an interior macro block), a macro block 11 having no object image data (hereinafter, it is referred to as an exterior macro block), and another macro block 15 consisting of a region having the object image data and another region having no object image data (hereinafter, it is referred to as a boundary macro block).

One macro block, as illustrated in FIG. 2, is coded by splitting it into luminance sub-blocks B1 to B4, two chrominance signal sub-blocks B5 and B6, and four shape data sub-blocks B7 to B10.

The luminance block of the boundary macro block 15, as illustrated in FIG. 3, is split into 8×8 sub-blocks: a sub-block 31 having only image data(hereinafter, it is referred to as an interior sub-block), a sub-block 33 having no object image data(hereinafter, it is referred to as an exterior sub-block), and another sub-block 32 consisting of a region having the object image data and another region having no object image data (hereinafter, it is referred to as a boundary sub-block). In a method of encoding image data of the object made of the above sub-blocks, the exterior sub-block and the exterior macro block in the boundary macro block are not coded, while the interior sub-block and the interior macro block in the boundary macro block are coded by using a discrete cosine transform (DCT) or a shape adaptive DCT (SADCT).

But with the conventional method of encoding image data in an object, the quality of the image is inversely proportional to a bit ratio reducing efficiency. In other words, if the quality of the image is improved, the bit ratio reducing efficiency is decreased and vice versa. Therefore, there has been provided an encoding/decoding method of merging adjacent boundary sub-blocks into one block, thereby minimizing the decrease of the quality of the image while reducing the bit ratio of the coded bit as well as maintaining and enhancing the quality of the image.

As described above, the boundary block merging/splitting technique is applied to only luminance blocks of the boundary macro block and finally coding/decoding the block, so that the technique can maintain or enhance the quality of image without drastically decreasing the quality of the image, and reducing coded bits of the image data, gaining high coding/decoding efficiency.

Gray scale shape data are to be applied to an image synthesis, originally for representing an object region and its transparency. But for coding, the gray scale shape data is to be split into the binary shape data for representing the object region and the transparency data made of the transparency value as in FIG. 4. A supporting means 42 receives gray scale shape data 41, and extracts and outputs the binary data. The binary shape data output from the support means 42 are input to the binary shape data coding means 43. A transparency data extracting means 44 receives the gray scale shape data, and extracts and outputs the transparency data. The transparency data coding means 45 receives the transparency data output from the transparency data extracting means 44 and codes the transparency data by using a content-based texture coding technique as discussed below.

But, when the conventional content-based texture coding technique is applied to coding the transparency data of the gray scale shape data, the quality of image is still inversely proportional to the bit ratio reducing effect. Therefore, if the quality of image is improved, the bit ratio reducing effect is decreased and vice versa.

SUMMARY OF THE INVENTION

Accordingly, the present invention is directed to a gray scale shape data encoder/decoder that substantially obviates one or more of the problems due to limitations and disadvantages of the related art.

An object of the present invention is to provide a gray scale shape data encoder/decoder which uses a boundary block merging/splitting technique applicable to the content-based texture coding technique to code/decode transparency data of the gray scale shape data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a gray scale shape data encoder in shape data coding devices of the invention includes:

shape data extracting means for receiving a video signal, extracting and outputting shape data;

transparency data extracting means for receiving the shape data from the shape data extracting means, extracting and outputting transparency data;

boundary block merging means for receiving the transparency data output from the transparency data extracting means, performing a boundary block merging step, and outputting the merged signal;

transparency data coding means for receiving the transparency data merged in the boundary block merging means, coding and outputting them;

supporting means for receiving the shape data from the shape data extracting means and extracting binary shape data;

binary shape data coding means for receiving binary shape data from the supporting means, coding and outputting them; and binary shape data decoding means for receiving the coded binary shape data from the binary shape data decoding means, re-decoding them and outputting the reproduced binary shape data.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 5:
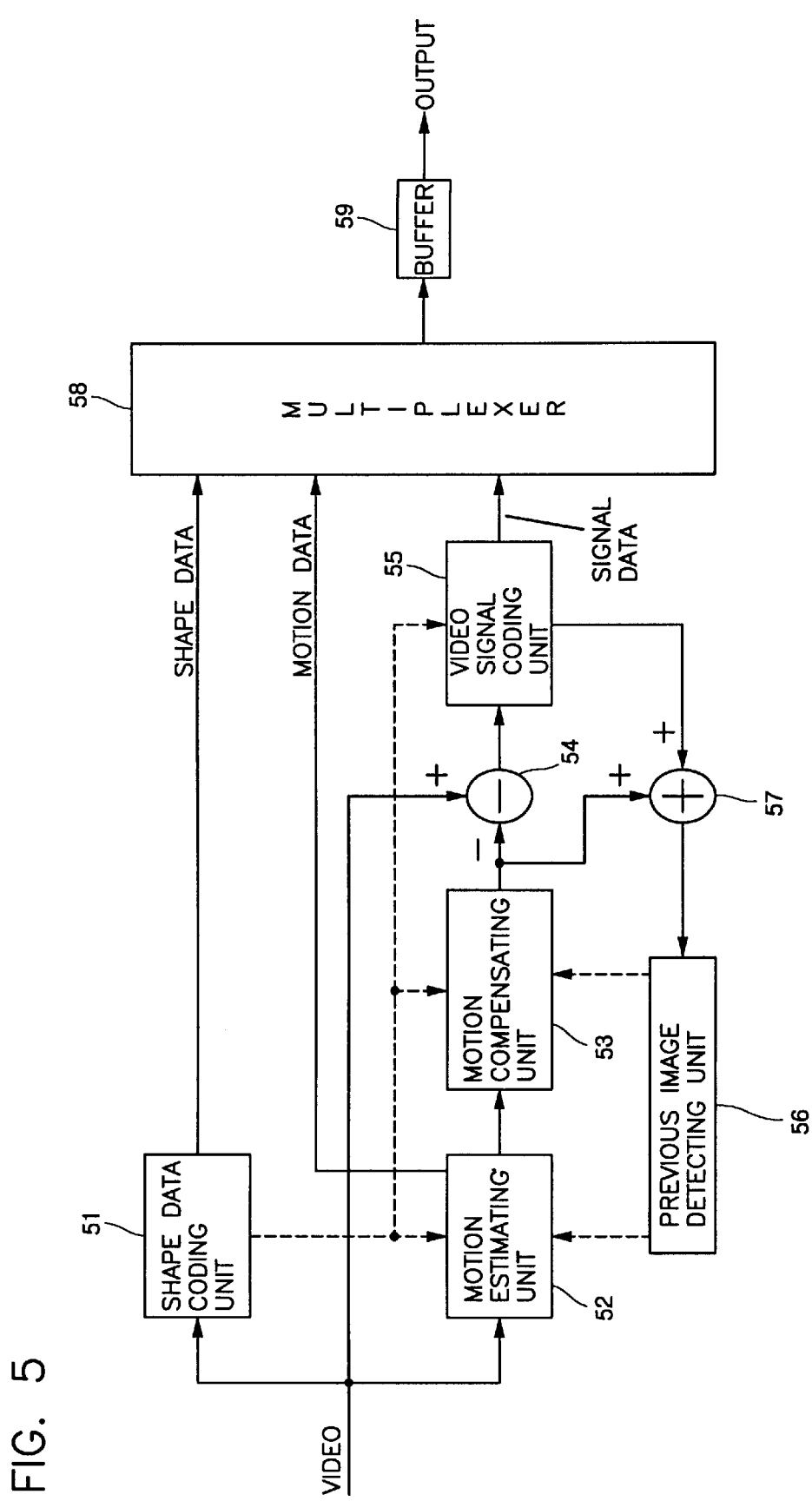
FIG. 5 is a block diagram illustrating the structure of a video signal encoder, to which a gray scale shape data encoder for coding gray scale shape data of the invention is applied.

FIG. 5 is a block diagram illustrating the structure of a video signal encoder, to which a gray scale shape data encoder for coding gray scale shape data of the invention is applied. Here, the gray scale shape data encoder will be denoted as a shape data coding unit of a video signal encoder.

A shape data coding unit 51 receives a video signal generated in a video signal generating means, extracts the shape data, divides them into binary shape data and transparency data, codes the transparency data through a boundary block merging step, and codes the binary shape data in the binary shape data coding means 43 as is known in the prior art. The video signal is also input to a motion estimation unit 52 to estimate the motions in the unit of a macro block. The motion data of the macro block estimated in the motion estimation unit 52 are input to a motion compensation unit 53 to get a compensation for the motion. The macro of the video signal that were motion compensated in the motion compensation unit 53 are input to a subtractor 54 with the video signal output from a camera means to detect the difference. The difference detected in the subtractor 54 is input to a video signal coding unit 55 with the shape data output from the shape data coding unit 51 in order to code the video signal of the object as sub-blocks.

The macro blocks of the video signal that was compensated in the motion compensation unit 54 and the internal data of the object coded in the video signal coding unit 55 are input to a summer 57. The output signal of the summer 57 is input to the previous image detecting unit 56 to detect the image of the previous screen. The image of the previous screen is input to the motion estimation unit 52 and the motion compensation unit 53 and used for the motion estimation and compensation.

The motion data estimated in the motion estimation unit 52, the internal data of the object coded in the video signal coding unit 55, and the shape data coded in the shape data coding unit 51 are multiplexed in a multiplexer 58 and transmitted as a bit stream through a buffer part 59.

Figure 6:
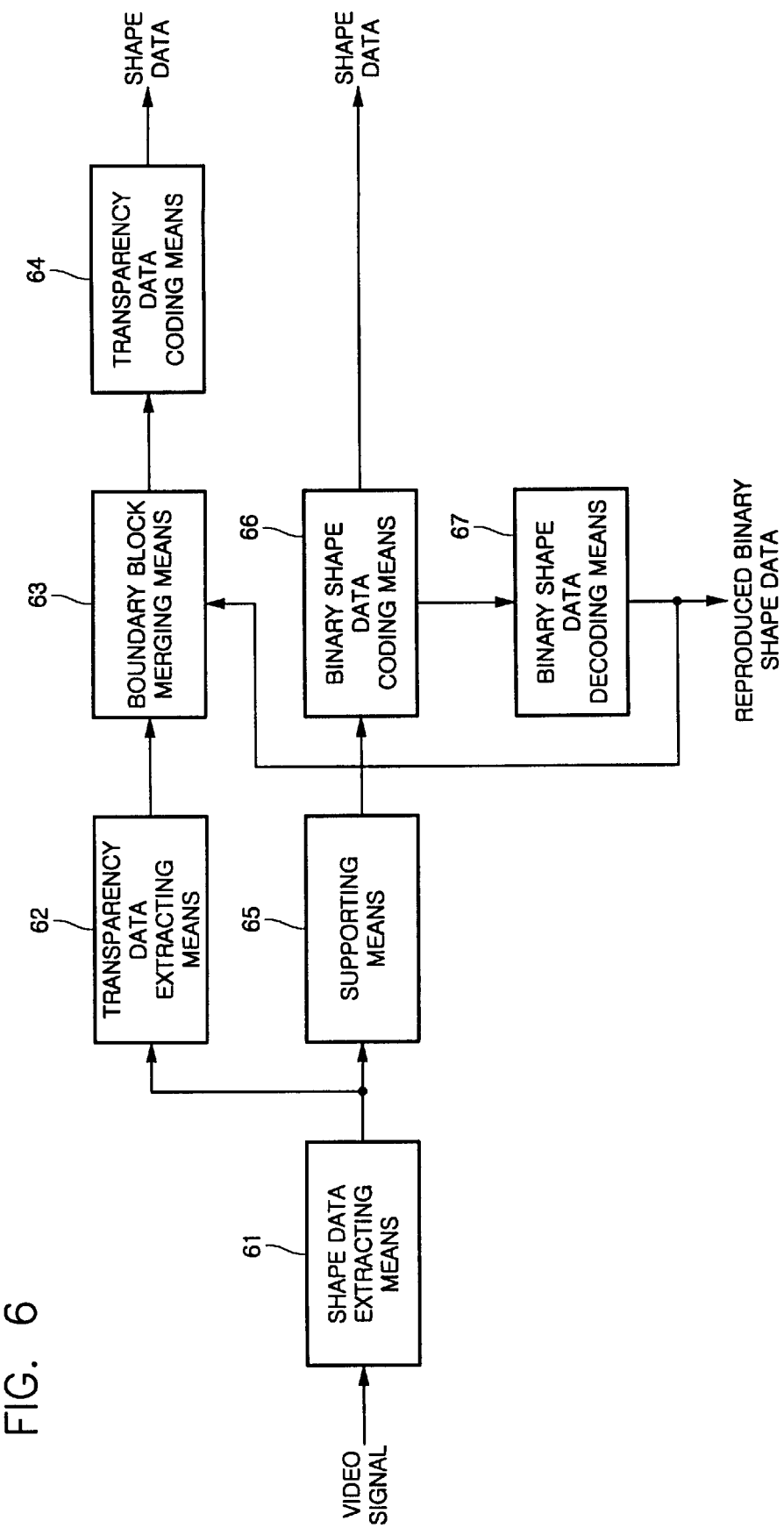
FIG. 6 is a block diagram of the structure of a gray scale shape data encoder of the invention.

As illustrated in FIG. 6, a shape data extracting means 61 receives a video signal generated in the video signal generating means such as a camera, and extracts and outputs the shape data. A transparency data extracting means 62 receives the shape data from the shape data extracting means 61, extracts and outputs the transparency data. A boundary block merging means 63 receives the transparency data output from the transparency data extracting means 62, performs a boundary block merging process and outputs the merged signal. A transparency data coding means 64 receives the transparency data merged in the boundary block merging means 63, codes and outputs them. A supporting means 65 receives the shape data output from the shape data extracting means 61 and sets a pixel below a threshold value to "0" and a pixel above the threshold value is set to "255" to extract the binary shape data. A binary shape data coding means 66 receives the binary shape data from the supporting means 65, codes and outputs them. A binary shape data decoding means 67 receives the binary shape data coded in the binary shape data coding means 66, and outputs the decoded and thus reproduced binary shape data to the boundary block merging means 63, the motion estimation unit 52, the motion compensation unit 53 and the video signal coding unit 55, In the case where a multitude of objects are in one screen, a background screen and the multitude of objects are split. Each of the screens and the objects are coded, so that a user can transmit only the desired object in the object image, or find, read and edit the screen. A unit block having predetermined shape data separated from the background may be defined as a Video Object Plane (VOP), which means a minimum square that includes the object in the image.

Figure 1:
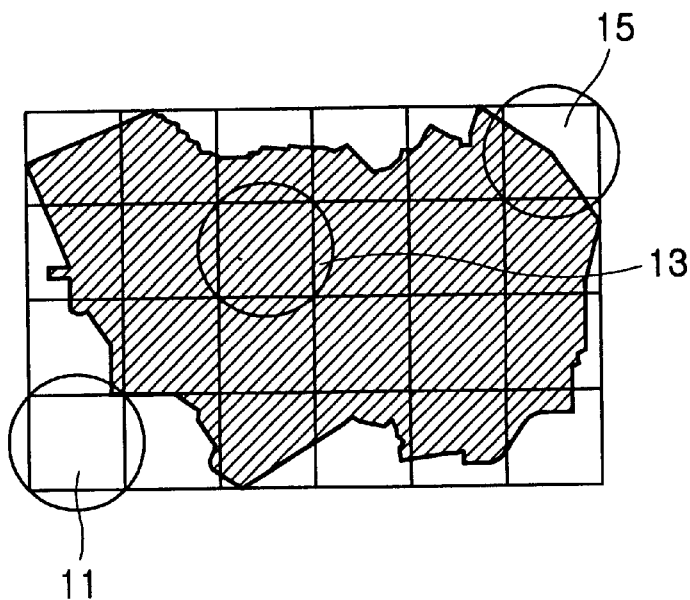
FIG. 1 illustrates a screen formed by rearranging an image with 16×16 macro blocks.
Figure 3:
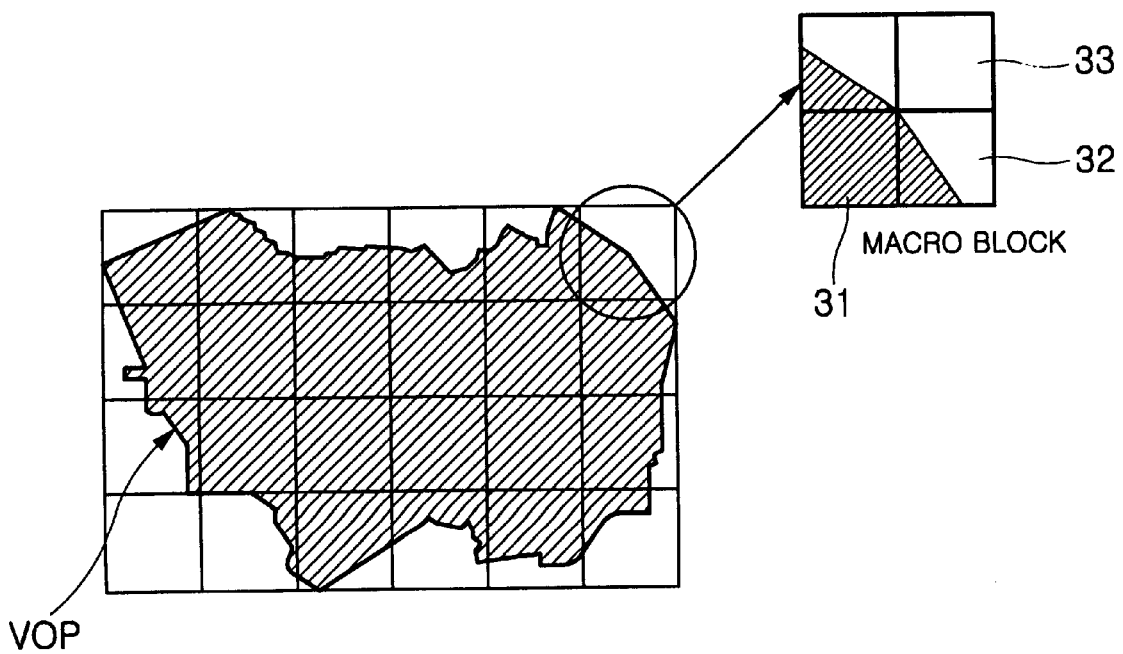
FIG. 3 is a diagram in which a luminance block of a boundary macro block into 8×8 sub-blocks in size.
Figure 2:
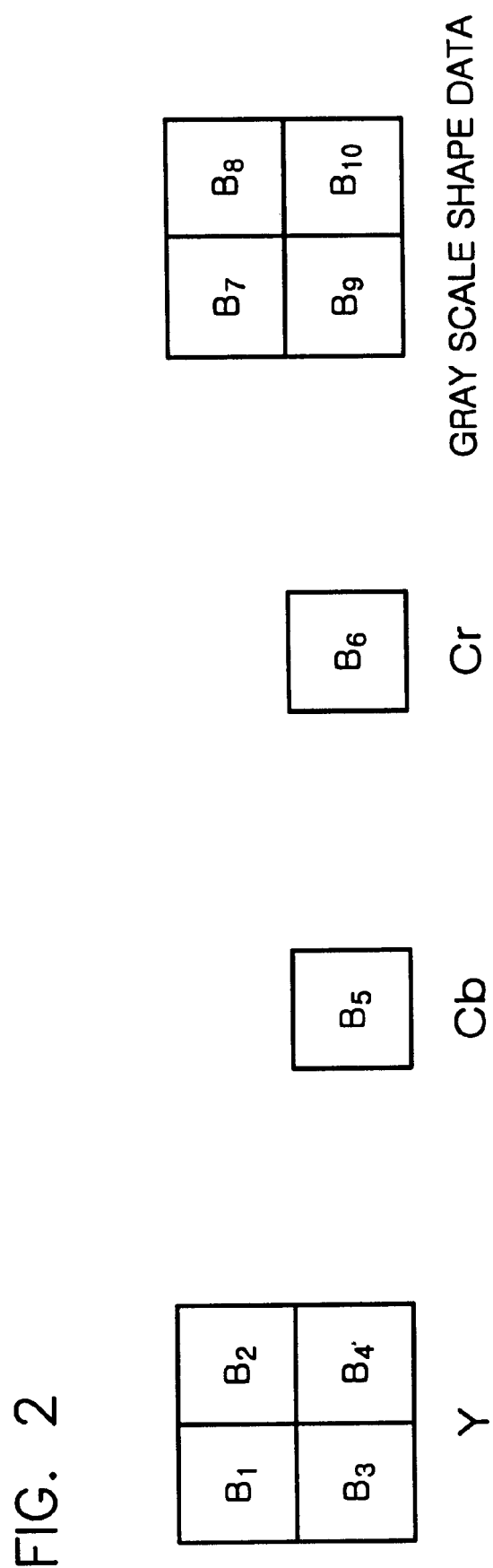
FIG. 2 is a signal for structuring a macro block.
Figure 4:
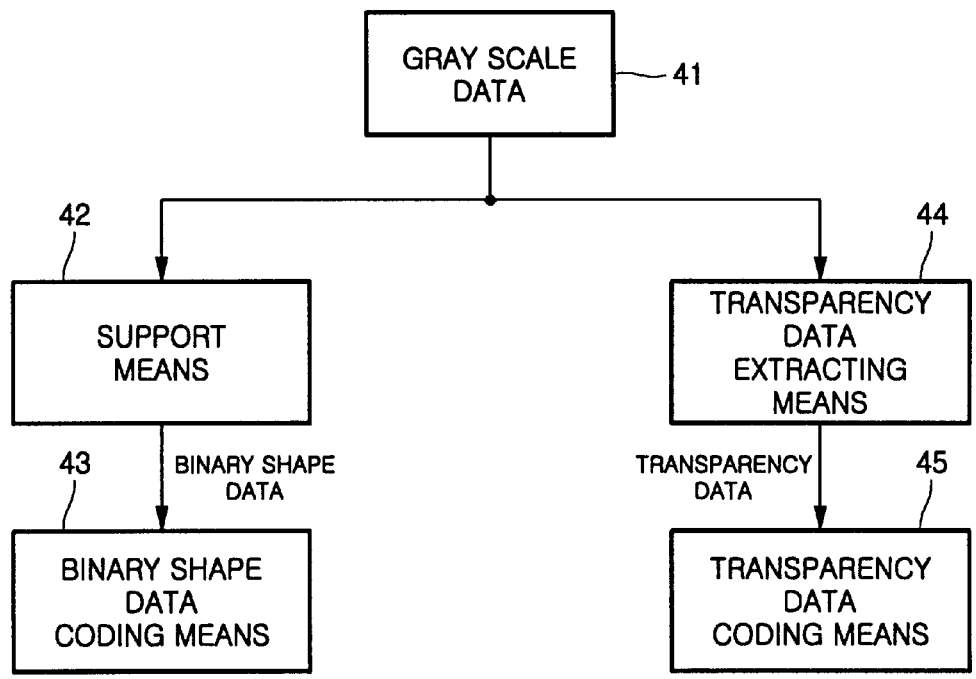
FIG. 4 is a block diagram of the structure of a conventional shape data coding unit.

FIG. 1 is an example of the VOP having a predetermined shape and reconstructed in the form of macro blocks of 16×16 pixels, for coding. In the reconstructed VOP, as illustrated in FIG. 1, there are three types of macro blocks: a macro block in object 13 made of only data in the object; a macro block out of object 11 without data in the object; and a boundary macro block 15 having partial data in the object. In the boundary macro block 13 forming the VOP, as illustrated in FIG. 3, there are three types sub-blocks. If the boundary sub-block is merged with another boundary sub block to perform coding, the coding efficiency is increased.

In addition, if the decoding step is performed by applying the boundary block splitting step to the merged boundary sub-block, the decoding efficiency is also increased.

Figure 7:
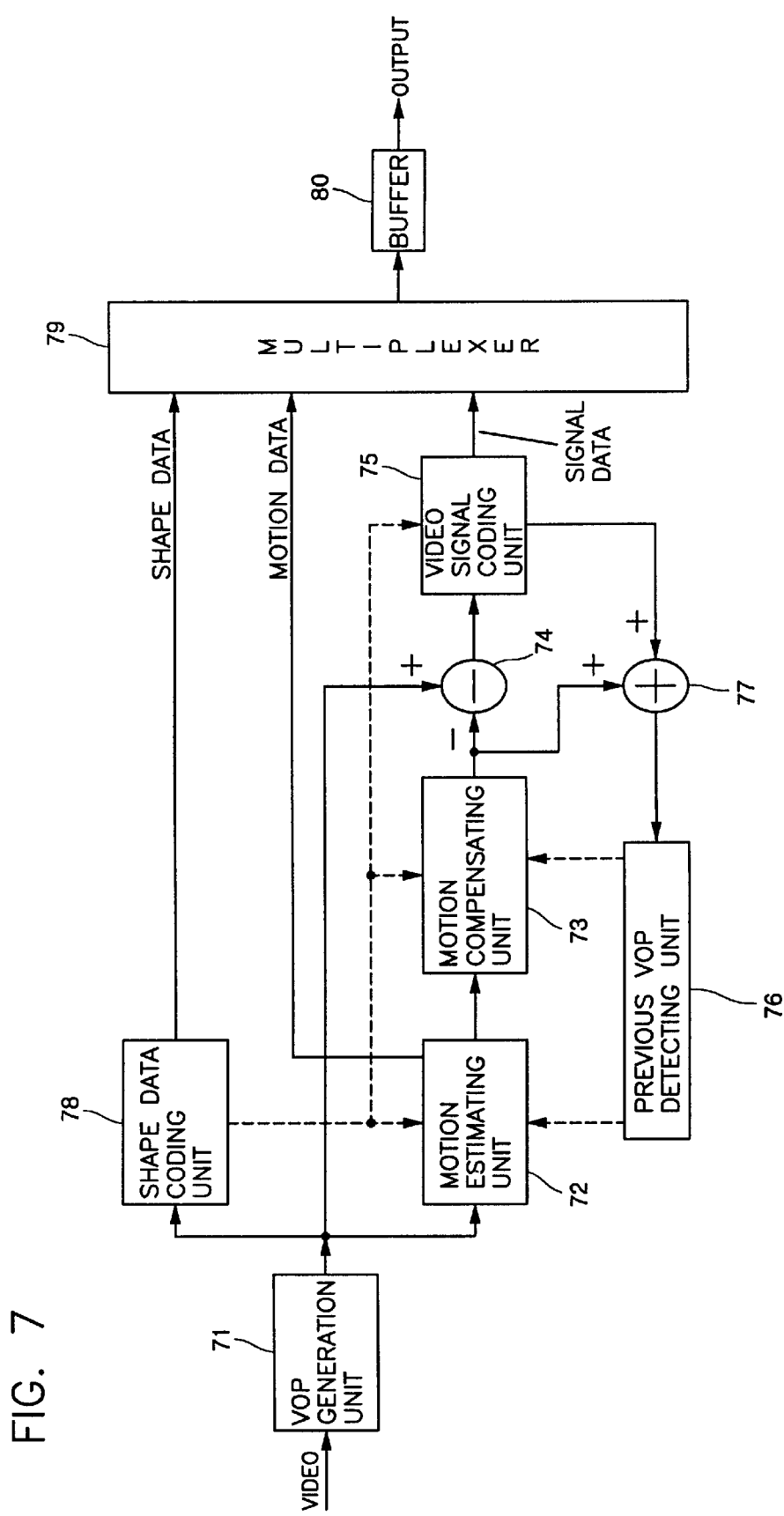
FIG. 7 is a block diagram illustrating the structure of the video signal encoder to which the gray scale shape data encoder of the invention is applied according to one embodiment of the invention.

FIG. 7 is a block diagram illustrating the structure of the video signal encoder to which the gray scale shape data encoder of the invention is used according to one embodiment of the invention. Here, the gray scale shape data encoder will be denoted as a shape data coding unit of a video signal encoder.

A video signal is input to a VOP generating unit 71. The VOP generation unit 71 generates a VOP and outputs it. The VOP for each of the objects is input to a motion estimation unit 72, and the motion is estimated as macro blocks.

The VOP motion data estimated through the motion estimation unit 72 are input to a motion compensation unit 73. The VOP whose motion is compensated through the motion compensation unit 73 is input to a subtractor 74 with the VOP generated in the VOP generation unit 71. The subtractor 74 detects the difference between the two. This difference detected in the subtractor 64 is input to a video signal coding unit 75 with the shape data output from a shape data coding unit 78 and is subsequently coded. The VOP whose motion is compensated by the motion compensation unit 73 and the internal data of the object of the video signal coding unit 75 are input to a summer 77, and the output signal of the summer 77 is input to a previous VOP detection unit 76 to detect the VOP of the previous screen. The VOP of the previous screen detected in the previous VOP detection unit 76 is input to the motion estimation unit 72 and the motion compensation unit 73 and used for the motion estimation and compensation. The VOP generated in the VOP generation unit 71 is input to the shape data coding unit 78 to have its shape data coded. The motion data estimated in the motion estimation unit 72, the internal data of the object coded in the video signal coding unit 75, and the shape data coded in the shape data coding part 78 are multiplexed in a multiplexer 79 and transmitted as a bit stream through a buffer part 70.

The shape data coding units 51 and 78 of the invention are structured as illustrated in FIG. 6. The video signal generated in an image generation means or the VOP generated in the VOP generation unit 71 is input to the shape data extracting means 61. The extracting means 61 extracts and outputs the shape data from the video signal or VOP. Within the shape data, a pixel below a threshold value is set to "0", and a pixel above the threshold pixel is set to "255" to output the binary shape data. The binary shape data output from the supporting means 65 are input to the binary shape data coding means 66, coded and output. Simultaneously, they are input to the binary shape data decoding means 67 to be decoded and input to the motion estimation units 51 and 72, the motion compensation units 53 and 73 and the video signal coding units 55 and 75.

Meanwhile, the shape data extracted in the shape data extracting means 61 are input to the transparency data extracting means 62. The transparency data extracting means 62 extracts the transparency data from the shape data. The transparency data which denotes their transparency, is made of 16×16 macro blocks, and is sequentially coded from the left-upper side to the right-lower side horizontally and vertically as a macro block.

The boundary block merging means 63 divides the transparency data macro block into block 1 to block 4 each being 8×8 in size as illustrated in FIGS. 8A to 8D to perform the merging step. FIGS. 8A to 8D show the state where the merging step of the invention is applied to the gray scale shape data block. The boundary block merging means 63 determines if the luminance block will be merged, as illustrated in FIGS. 8A to 8D, by using the reproduced shape data output from the binary shape data decoding means 67.

Figure 8A:
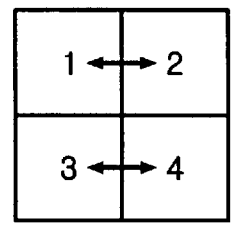
FIGS. 8A to 8D illustrate the state where a merging step of the invention is applied to the gray scale shape data block.

As in FIG. 8A, the block 1 and the block 2 are compared, and the block 3 and the block 4 are compared to perform the horizontal merging step. That is, if blocks 1 and 2 are the boundary blocks and there is no overlapped object pixel between the one generated by rotating block 2 at an angle of 180° and block 1, the object generated by rotating the block 2 at an angle of 180° and the shape data are merged in block 1, and block 2 is converted into an exterior block. The block 3 and the block 4 are merged in the same manner. If the number of the boundary block merged in the horizontal merging is not less than one, a vertical merging (refer to FIG. 8B) and a diagonal merging (refer to FIG. 8C) are skipped. If there is no boundary block merged in the horizontal merging, a vertical merging is performed.

Figure 8B:
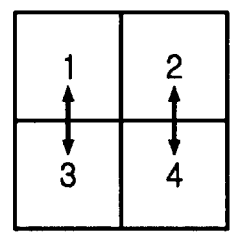

FIG. 8B illustrates the vertical merging step. The blocks 1 and 3 are the boundary blocks. If there is no overlapped object pixel between the block generated by rotating block 3 at an angle of 180° and block 1, the object generated by rotating block 3 at an angle of 180° and the shape data are merged in block 1, and the block 3 is converted into an exterior block. Block 2 and block 4 are merged in the same manner. If the number of the boundary block merged in the vertical merging is not less than one, a diagonal merging is skipped. If there is no boundary block merged in the vertical merging, a diagonal merging is performed.

Figure 8C:
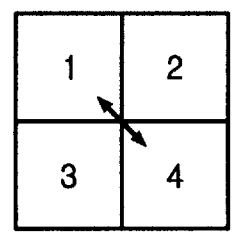
Figure 8D:
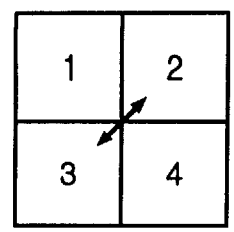

FIGS. 8C and 8D illustrate a diagonal merging. If blocks 1 and 4 are the boundary blocks and there is no overlapped object pixel between object one generated by rotating block 4 at an angle of 180° and block 1, the object generated by rotating block 4 at an angle of 180° and the shape data are merged in block 1, and block 4 is converted into an exterior block. Block 2 and block 3 are merged in the same manner.

In the above merging step, the condition for checking the overlapped pixel between two blocks can be combined with other conditions. For examples, a rotation at an angle of 90° clockwise, a rotation at an angle of 90° counterclockwise, symmetry in left, right, up and down, and a diagonal symmetry, excluding the above-mentioned rotation at an angle of 180°.

Figure 9:
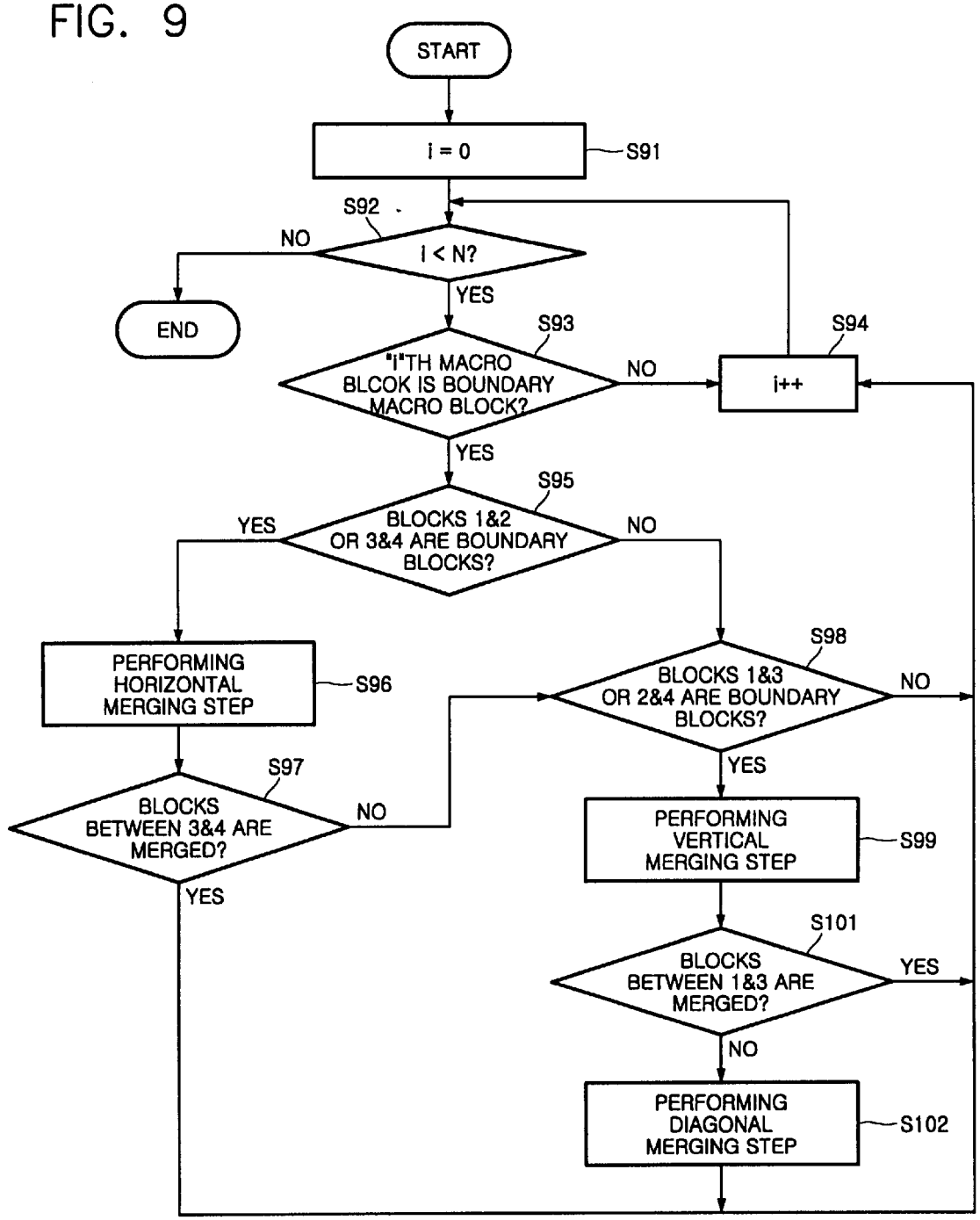
FIG. 9 is a flowchart illustrating procedures of merging gray scale shape data of the invention.

As illustrated in FIG. 9, the procedure for merging the gray scale shape data of the invention are as follows.

The "i"th sequence flag for representing the sequence of the current macro block is set for "0" in step S91. It is determined if the number of the sequence flag "i" is smaller than the maximum number N of the macro block in step S92. If it is not smaller, the current program ends. If it is smaller, it is determined if the current macro block "i" is a boundary macro block. If not, the sequence flag "i" is increased by "1" in step S94, and the steps below the step S92 are repeated. If the current macro block "i" is a boundary macro block, it is determined if the blocks 1 and 2 and the blocks 3 and 4 are boundary blocks in step S96. If they are boundary blocks, the horizontal merging step is performed in step S97. In other words, if the blocks 1 and 2 are boundary blocks and there is no overlapped pixel between block 1 and the block formed by rotating the block 2 at an angle of 180°, the transparency data of the rotated block 2 is merged into the transparency data of block 1, and block 2 is converted into an exterior block. In addition, if blocks 3 and 4 are boundary blocks and there is no overlapped pixel between block 3 and the block formed by rotating block 4 at an angle of 180°, the transparency data of the rotated block 4 is merged into the transparency data of block 3, and block 4 is converted into an exterior.

Figure 10:
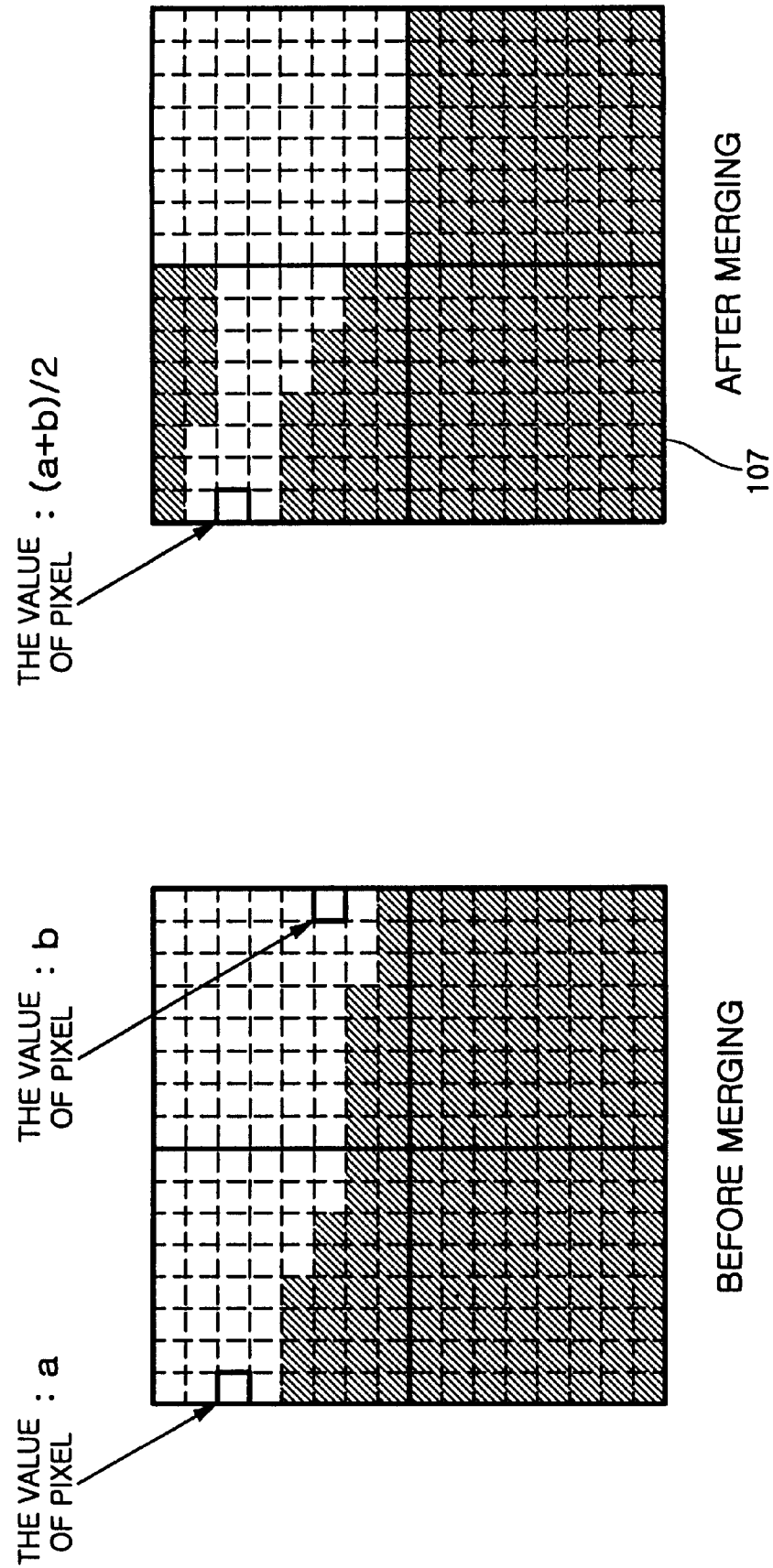
FIG. 10 illustrates procedures of padding the value of the pixel outside of an object in the merged block.

In the case where boundary blocks 1 and 2 are merged with each other, the value of the exterior pixel of the merged block 1 is padded as illustrated in FIG. 10.

$$(a \times num\_a + b \times num\_b)/(num\_a + num\_b) \qquad (1)$$

a: value of the exterior pixel before merging of the block 1
b: value of the exterior pixel before merging of the block 2
num_a: number of interior pixels of block 1
num_b: number of interior pixels of block 2

In case where blocks 3 and 4 are merged, the value of the exterior pixel of the merged block 3 is padded in the same manner by using the equation (1). In addition, the padding is performed with the average value (a+b)/2 of the value of the exterior pixel "a" before merging of the block 1 and the value of the pixel out of object "b" before merging of the block 2. And it is the same as in the case where the blocks 3 and 4 are merged. In the case where the exterior pixel of the boundary blocks is zero-padded before merging, the value of exterior pixel of the merged block can be padded into "0".

If there is a horizontally merged block in step S97, step S98 is performed. If there is no boundary block in step S95, it is determined if blocks 1 and 3 or 2 and 4 are boundary blocks in step S98. If they are not the boundary blocks, step S94 is performed. If they are boundary blocks, the vertical merging is performed in step S99. If blocks 1 and 3 are boundary blocks and there is no overlapped pixel between block 1 and the block formed by rotating block 3 at an angle of 180°, the transparency data of the rotated block 3 is merged with the transparency data of block 1, and block 3 is converted into an exterior block. In addition, if blocks 2 and 4 are boundary blocks and there is no overlapped pixel between block 2 and the block formed by rotating block 4 at an angle of 180°, the transparency data of rotated block 4 are merged into the transparency data of block 2, and block 4 is converted into an exterior block. After performing the vertical merging, the padding step as discussed above is performed by using the equation (1). In addition, the padding is performed with the average value (a+c)/2 of the value of the exterior pixel "a" before merging block 1 and the value of the exterior pixel "c" before merging block 3. The same occurs in the case where blocks 2 and 4 are merged. In the case where the exterior pixel of the boundary blocks are zero-padded before the merging, the value of the exterior pixel of the merged block can be padded into "0".

It is determined if there is a merging between the blocks 1 and 3 or 2 and 4 in step S101. If there is a vertically merged block, the diagonal merging is omitted. The merging step ends, and step S94 is performed. If there is no merging, the diagonal merging is performed in step S102. That is, if the blocks 1 and 4 are boundary blocks and there is no overlapped pixel between block 1 and the block formed by rotating block 4 at an angle of 180°, the transparency data of the rotated block 4 is merged into the transparency data of block 1, and block 4 is converted into an exterior block. In addition, the same merging step is performed with respect to blocks 2 and 3. After performing the diagonal merging, the padding step as discussed above is performed by using the equation (1). In addition, the padding is performed with the average value (a+d)/2 of the value of the exterior pixel "a" before merging block 1 and the value of the exterior pixel "d" before merging block 4. The same occurs in the case where blocks 2 and 3 are merged. In the case where the exterior pixel of the boundary blocks are zero-padded before the merging, the value of the exterior pixel of the merged block can be padded into "0".

Meanwhile, a step for splitting the boundary blocks after the decoding is performed, in order to restore the transparency data into the original shape of a block. The splitting step is made by checking in the same manner as in the merging step by using the binary shape data of the gray scale shape data which displays the object region and texture.

Figure 11:
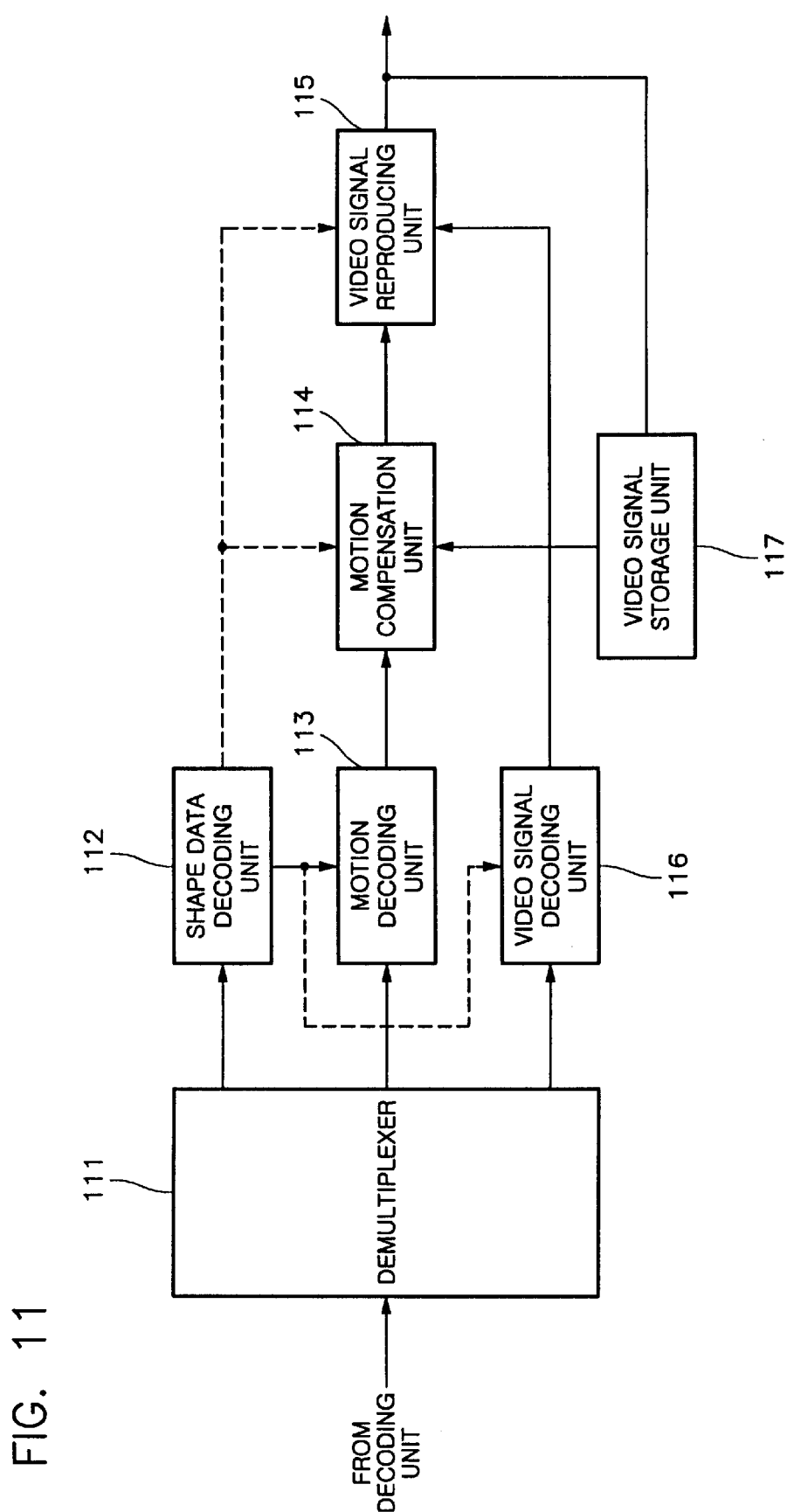
FIG. 11 is a block diagram illustrating the structure of the video signal decoder to which the gray scale shape data decoder of the invention is applied.

FIG. 11 is a block diagram illustrating the structure of a video signal decoder to which the gray scale shape data decoder of the present invention is applied. Here, the gray scale shape data decoder is denoted as the shape data decoding unit of the video signal decoder.

The image data of the multiplexed gray scale received from the video signal coding device are input to a demultiplexer 111, and the multiplexed signal is demultiplexed and output. The shape data output from the demultiplexer 111 is decoded in a shape data decoding unit 112. The coded motion data output from the demultiplexer 111 is input to a motion decoding unit 113 and the motion data is detected. A video signal decoding unit 116 receives the shape data of the shape data decoding unit 112 and the image data of the demultiplexer 111, and decodes the video signal. A motion compensation unit 114 receives the motion data detected in the motion decoding unit 113, the shape data output from the shape data decoding unit 112, and the video signal data output from a video signal storage unit 117, and compensates their motions. A video signal reproducing unit 115 receives the shape data output from the shape data decoding unit 112, the motion compensation data output from the motion compensation unit 114 and the video signal output from the video signal decoding unit 116, and reproduces a frame of the video signals.

Figure 12:
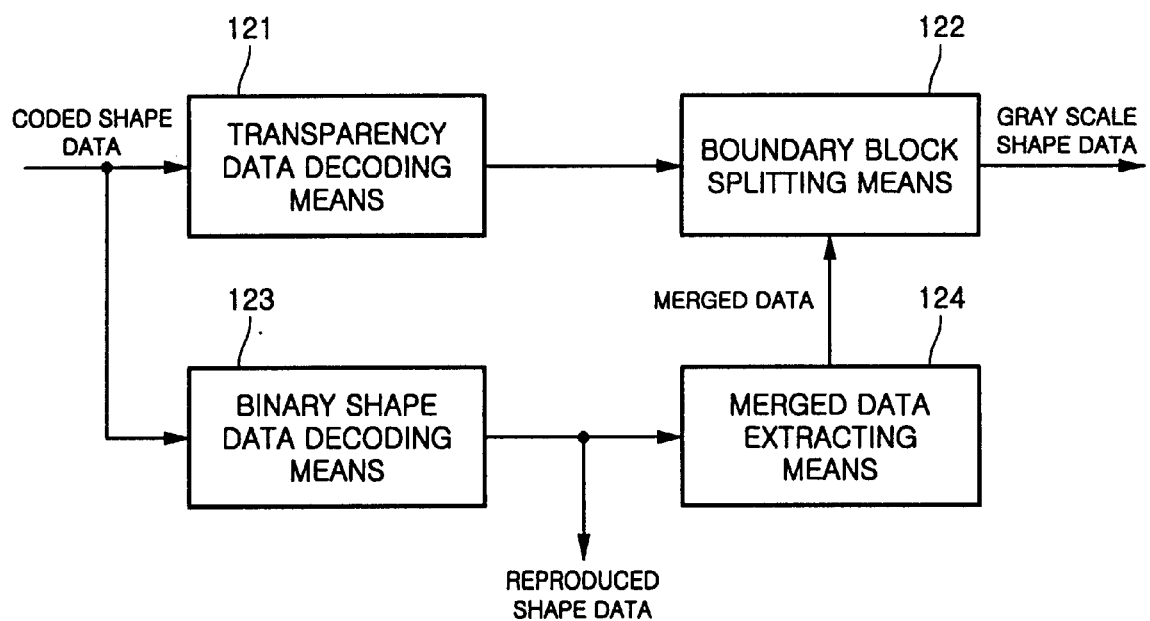
FIG. 12 is a block diagram illustrating the structure of the gray scale shape data decoder of the invention.

As illustrated in FIG. 12, a transparency data decoding means 121 receives the coded shape data output from the encoder and decodes the transparency data. A binary shape data decoding means 123 receives the coded shape data output from the encoder, and decodes the binary shape data. A merged data extracting means 124 receives the binary shape data from the binary shape data decoding means 123, and extracts the merged data. A boundary block splitting means 122 receives the transparency data from the transparency decoding means 121 and the merged data output from the merged data extracting means 124, performs the boundary block splitting step and output the shape data.

Figure 13:
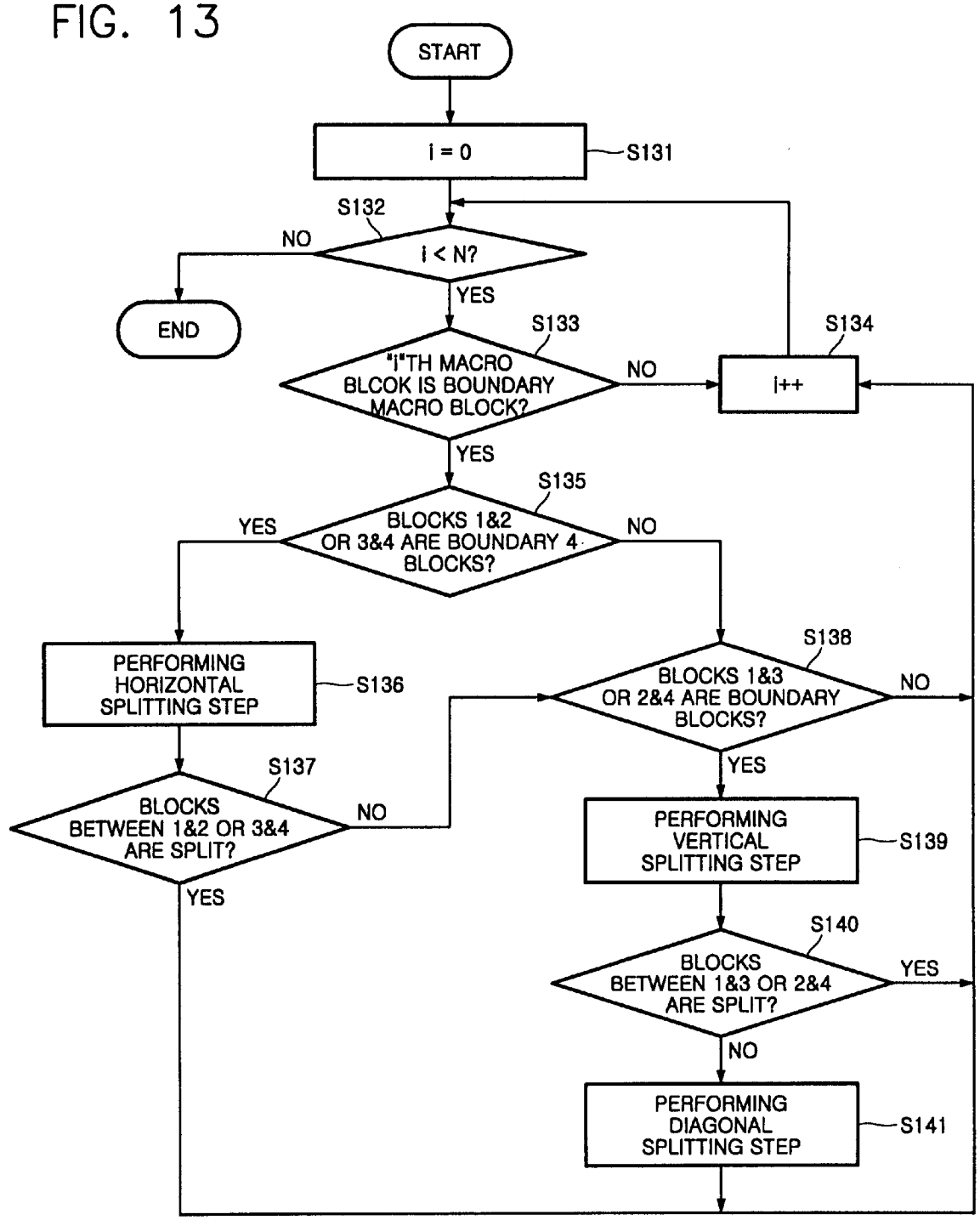
FIG. 13 is a flowchart illustrating procedures of splitting boundary blocks according to the invention.

As illustrated in FIG. 13, the procedures for splitting the gray scale shape data of the present invention is as follows.

The "i"th sequence flag for representing the sequence of the current macro block is set to "0" in step S131. It is determined if the number of the sequence flag "i" is smaller than the maximum number N of the macro block in step S132. If it is not smaller, the current program ends. If it is smaller, it is determined if the current macro block "i" is a boundary macro block. If not, the sequence flag "i" is increased by "1" in step S134, and the steps below step S132 are repeated. If the current macro block "i" is a boundary macro block, it is determined if blocks 1 and 2 and blocks 3 and 4 are boundary blocks in step S135. If they are boundary blocks, the horizontal splitting step is performed in step S136. In other words, if blocks 1 and 2 are boundary blocks and there is no overlapped pixel between block 1 and the block formed by rotating block 2 at an angle of 180°, the transparency data of the rotated block 2 is split from transparency data of block 1 and recorded in block 2. In addition, if blocks 3 and 4 are boundary blocks and there is no overlapped pixel between block 3 and the block formed by rotating block 4 at an angle of 180°, the transparency data of the rotated block 4 is split from the transparency data of block 3 recorded in the block 4.

In step S137, it is determined if blocks 1 and 2 or 3 and 4 have split. If there is a horizontally split block, the horizontal and vertical splittings are omitted. The sequence flag "i" is increased by "1" in step S134, and the steps below S132 are repeated. If there is no splitting in the step S137, step S138 is performed. If there is no boundary block in step S135, it is determined if blocks 1 and 3 or 2 and 4 are boundary blocks in step S138. If they are not the boundary blocks, step S134 is performed. If they are boundary blocks, the following vertical splitting is performed. That is, if the blocks 1 and 3 are boundary blocks and there is no overlapped pixel between the block 1 and the block formed by rotating block 3 at an angle of 180°, the transparency data of the rotated block 3 split from the transparency data of block 1 and recorded in block 3. In addition, if blocks 2 and 4 are the boundary blocks and there is no overlapped pixel between block 2 and the block formed by rotating block 4 at an angle of 180°, the transparency data of the rotated block 4 is split from the transparency data of block 2 and recorded in block 4.

It is determined if a splitting has occured between blocks 1 and 2 or 3 and 4 in step S140. If there is a vertically split block, the diagonal splitting is omitted, and step 134 is performed. If no vertical splitting has occured, the diagonal splitting is performed in step S141. That is, if blocks 1 and 4 are boundary blocks and there is no overlapped pixel between block 1 and the block formed by rotating block 4 at an angle of 180°, the transparency data of the rotated block 4 is split from the transparency data of block 1 and recorded in block 4. In addition, the same splitting step is performed with respect to blocks 2 and 3.

As described above, the invention codes and decodes with the technique of merging/splitting the boundary blocks by utilizing the remaining space between the transparency data of the gray scale shape data for representing the transparency, thereby having an effect on maintaining and enhancing the quality of images as well as reducing the number of coded/decoded bits. Furthermore, as the coded/decoded blocks are reduced by the boundary block merging/splitting technique, an amount for the additional calculation is reduced, and therefore we can desire the improved performance in realizing algorithm and architecting systems.

It will be apparent to those skilled in the art that various modifications and variations can be made in the gray scale shape data encoder/decoder and a method thereof of the present invention without departing from the spirit or scope of the invention. Thus, it is intended that the present invention cover the modifications and variations of this invention provided they come within the scope of the appended claims and their equivalents.

What is claimed is:

1. A gray scale shape data encoder for use in shape data coding devices, comprising:

shape data extracting means for receiving a video signal, extracting and outputting shape data;

transparency data extracting means for receiving the shape data from the shape data extracting means, extracting and outputting transparency data said transparency data comprising a plurality of macro blocks, said macro blocks comprising a plurality of pixels;

boundary block merging means for receiving the transparency data output from the transparency data extracting means, performing a boundary block merging step, and outputting a merged signal, said merged signal comprising a plurality of said macro blocks, said macro blocks divided into a plurality of interior, exterior, and boundary sub blocks, said sub blocks denoted as a block 1, a block 2, a block 3, and a block 4;

transparency data coding means for receiving the transparency data merged in the boundary block merging means, coding and outputting them;

supporting means for receiving the shape data from the shape data extracting means and extracting binary shape data;

binary shape data coding means for receiving binary shape data from the supporting means, coding and outputting them; and binary shape data decoding means for receiving the coded binary shape data from the binary shape data decoding means, re-decoding them and outputting reproduced binary shape data.

2. The encoder as claimed in claim 1, wherein the support means extracts the binary shape data by setting a pixel below the threshold value to "0" and a pixel above the threshold value to "255".

3. The encoder as claimed in claim 1, wherein the boundary block merging means pads the value of an exterior pixel of a merged block according to the following equation;

$$(a \times num\_a + b \times num\_b)/(num\_a + num\_b),$$

wherein:

a is the value of the exterior pixel before merging said block 1;

b is the value of the exterior pixel before merging said block 2;

num-a is the number of interior pixels of block 1;

num-b is the number of interior pixels of block 2.

4. The encoder as claimed in claim 1, wherein the boundary block merging means determines if a luminance block is merged by using the reproduced shape data output from the binary shape data decoding means.

5. The encoder as claimed in claim 1, wherein the boundary block merging means comprises a means for determining whether said block 1 and said block 2 are boundary block;

when said block 1 and block 2 are boundary blocks and there is no overlapped pixel between said block 1 and said block 2 rotated at an angle of 180 degrees, said block 2 rotated at an angle of 180 degrees and the shape data are merged with said block 1, said block 2 is converted into as an exterior block, and said block 3 and said block 4 are merged in the same manner.

6. The encoder as claimed in claim 1, wherein the boundary block merging means does not perform a vertical and diagonal merging when the number of the merged block after the horizontal merging is not less than one.

7. The encoder as claimed in claim 1, wherein the boundary block merging means comprises a means for determining if said block 1 and said block 3 are boundary blocks;

when said block 1 and said block 3 are boundary blocks and there is no overlapped pixel between said block 1 and said block 3 rotated at an angle of 180 degrees, said block 3 rotated at an angle of 180 degrees and the shape data are merged with said block 1, said block 3 is converted into an exterior block, and said block 2 and said block 4 are merged in the same manner.

8. The encoder as claimed in claim 1, wherein the boundary block merging means does not perform a diagonal merging step if the number of the merged block after the horizontal and vertical merging steps is not less than one.

9. The encoder as claimed in claim 1, wherein the boundary block merging means comprises a means for determining if said block 1 and said block 4 are boundary blocks;

when said block 1 and said block 4 are the boundary blocks and there is no overlapped pixel between said block 1 and said block 4 rotated at an angle of 180 degrees, said block 4 rotated at an angle of 180 degrees and the shape data are merged with said block 1, said block 4 is converted into as an exterior block, and said block 2 and said block 3 are merged in the same manner.

10. The encoder as claimed in claim 1, wherein the boundary block merging means determines a condition for checking an overlapped pixel between two blocks in said merging step by rotating a block at an angle of 90 degrees clockwise.

11. The encoder as claimed in claim 1, wherein the boundary block merging means determines a condition for checking an overlapped pixel between two blocks in said merging step by rotating a block at an angle of 90 degrees counterclockwise.

12. The encoder as claimed in claim 1, wherein the boundary block merging means determines a condition for checking an overlapped pixel between two blocks in said merging step by arranging a block symmetrically in a diagonal direction.

13. A gray scale shape data decoder for use in gray scale shape data decoding devices, comprising:
- transparency data decoding means for receiving coded shape data output from an encoder and decoding transparency data;
- binary shape data decoding means for receiving the coded shape data output from the encoder and decoding binary shape data;
- merged data extracting means for receiving the binary shape data from the binary shape data decoding means, and extracting merged data; and
- boundary block splitting means for receiving transparency data from the transparency data decoding means and the merged data from the merged data extracting means, performing a boundary block splitting step and outputting shape data.

14. A gray scale shape data coding method for use in a method for coding by merging gray scale shape data, comprising:
- a first step, said first step comprising executing a main program and receiving a macro block, wherein said macro block comprises a block 1, a block 2, a block 3 and a block 4;
- a second step, said second step comprising setting a sequence flag, said sequence flag representing the sequence of a current macro block, and determining whether the value of the sequence flag is smaller than a maximum number N of macro blocks;
- a third step, said third step comprising ending the main program when the value of the sequence flag is not smaller than the maximum number of macro blocks and when said sequence flag is smaller than the maximum number of macro blocks, determining whether a macro block "i" is a boundary macro block;
- a fourth step, said fourth step comprising increasing the sequence flag when the current macro block is not a boundary macro block and repeating said first through third step to determine whether the value of the sequence flag is smaller than the maximum number of macro blocks;
- a fifth step, said fifth step comprising performing a horizontal merging step when the current macro block is a boundary macro block;
- a sixth step, said sixth step comprising determining whether there is a horizontally merged block;
- a seventh step, said seventh step comprising omitting vertical merging and diagonal merging when there is a horizontally merged block, and ending said seventh step increasing the sequence flag by "1", and determining whether the value of the sequence flag is smaller than maximum number of macro blocks;
- an eighth step, said eighth step comprising determining whether said block 1 and block 3 are boundary blocks, and determining whether block 2 and block 4 are boundary blocks when there is no horizontal merging, increasing the sequence flag by "1" when said blocks are not boundary blocks, and determining whether the value of the sequence flag is smaller than the maximum number of macro blocks;
- a ninth step, said ninth step comprising performing a vertical merging step when said block 1 and block 3 in said step eight are boundary blocks, and performing a vertical merging step when said block 2 and block 4 are boundary blocks in said step eight;
- a tenth step, said tenth step comprising determining whether said block 1 and block 3 are merged, and determining if said block 2 and block 4 are merged;
- an eleventh step, said eleventh step comprising omitting diagonal merging when there is a vertically merged block, increasing the sequence flag by "1", and determining whether the value of the sequence flag is smaller than the maximum number of macro blocks; and
- a twelfth step, said twelfth step comprising performing a diagonal merging when there is no vertically merged block, increasing the sequence flag by "1" when said blocks are not boundary blocks, and determining if the value of the sequence flag is smaller than the maximum number of macro blocks.

15. The method as claimed in claim 14, wherein said fifth step is performed in a manner that transparency data of said block 2 rotated at an angle of 180 degrees is merged with transparency data of said block 1 when block 1 and block 2 are boundary blocks and when there is no overlapped pixel between said block 1 and said block 2 rotated at an angle of 180 degrees, and said block 2 is converted into a boundary block; transparency data of said block 4 rotated at an angle of 180 degrees is merged with transparency data of said block 3 when block 3 and block 4 are boundary blocks and when there is no overlapped pixel between said block 3 and said block 4 rotated at an angle of 180 degrees, and said block 4 is converted into a boundary block.

16. The method as claimed in claim 14, wherein said ninth step is performed so that transparency data of said block 3 rotated at an angle of 180 degrees is merged with transparency data of said block 1 when block 1 and block 3 are boundary blocks and when there is no overlapped pixel between said block 1 and said block 3 rotated at an angle of 180 degrees, and said block 3 is converted into a boundary block; transparency data of said block 4 rotated at an angle of 180 degrees is merged with transparency data of said block 2 when block 2 and block 4 are boundary blocks and when there is no overlapped pixel between said block 2 and said block 4 rotated at an angle of 180 degrees, and said block 4 is converted into a boundary block.

17. The method as claimed in claim 14, wherein said twelfth step is performed so that transparency data of said block 4 rotated at an angle of 180 degrees is merged with transparency data of said block 1, when block 1 and block 4 are boundary blocks and when there is no overlapped pixel between said block 1 and said block 4 rotated at an angle of 180 degrees, said block 4 is converted into a boundary block and, said twelfth step is performed with respect to block 2 and block 3 in a similar manner.

18. The method as claimed in claim 15, wherein the boundary block merging means pads the value of an exterior pixel of a merged block according to the following equation;

(a×num_a+b×num_b)/(num_a+num_b), wherein:
a is the value of the exterior pixel before merging of said block 1;
b is the value of the exterior pixel before merging of said block 2;
num_a is the number of interior pixels of block 1;
num_b is the number of interior pixels of block 2.

19. The method as claimed in claim 15, wherein a condition for checking an overlapped pixel between two blocks in the merging step is determined by rotating a block at an angle of 90 degrees clockwise.

20. The method as claimed in claim 15, wherein a condition for checking an overlapped pixel between two blocks in the merging step is determined by rotating a block at an angle of 90 degrees counterclockwise.

21. The method as claimed in claim 15, wherein a condition for checking an overlapped pixel between two blocks in the merging step is determined by arranging a block symmetrically in a diagonal direction.

22. A gray scale shape data decoding method for use in a method of decoding by splitting merged gray scale shape data, comprising:
a first step, said first step comprising executing a main program and receiving a current macro block, wherein said macro block comprises a block 1, a block 2, a block 3, and a block 4;
a second step, said step comprising setting a sequence flag for representing the sequence of said current macro block, and determining if the value of the sequence flag is smaller than a maximum number N of macro blocks;
a third step, said third step comprising ending the main program when the value of the sequence flag is not smaller than the maximum number of macro blocks, and when the value of the sequence flag is smaller than the maximum number of macro blocks, determining whether a macro block "i" is a boundary macro block;
a fourth step, said fourth step comprising increasing the sequence flag when the current macro block is not a boundary macro block, and repeating said first through third steps to determine whether the value of the sequence flag is smaller than the maximum number of macro blocks;
a fifth step, said fifth step comprising performing a horizontal splitting step when the current macro block is a boundary macro block;
a sixth step, said sixth step comprising determining whether there is a horizontally split block;
a seventh step, said seventh step comprising omitting vertical and diagonal splittings when there is a horizontally split block, increasing the sequence flag by "1", and determining whether the value of the sequence flag is smaller than the maximum number of macro blocks,
an eighth step, said eighth step comprising determining whether block 1 and block 3 are boundary blocks, and determining whether block 2- and block 4 are boundary blocks when there is no horizontal splitting, increasing the sequence flag by "1" when they are not boundary blocks, and determining whether the value of the sequence flag is smaller than the maximum number of macro blocks;
a ninth step, said ninth step comprising performing a vertical splitting step when said block are boundary blocks;
a tenth step, said tenth step comprising determining whether a split has occurred between block 1 and block 3 and determining whether a split has occurred between block 2 and block 4;
an eleventh step, said eleventh step comprising omitting diagonal splitting when there is a vertically split block, increasing the sequence flag by "1", and determining if the value of the sequence flag is smaller than the maximum number of macro blocks; and
a twelfth step, said twelfth step comprising performing a diagonal splitting when there is no vertically split block, increasing the sequence flag by "1" when said blocks are not boundary blocks, and determining whether the value of the sequence flag is smaller than the maximum number of macro blocks.

23. The method as claimed in claim 22, wherein said step five is performed so that transparency data of said block 2 rotated at an angle of 180 degrees is split from transparency data of said block 1 when block 1 and block 2 are boundary blocks and there is no overlapped pixel between said block 1 and said block 2 rotated at an angle of 180 degrees, and recorded in said block 2; transparency data of said block 4 rotated at an angle of 180 degrees is split from transparency data of said block 3 and recorded in said block 4 when block 3 and block 4 are boundary blocks and when there is no overlapped pixel between said block 3 and said block 4 rotated at an angle of 180 degrees.

24. The method as claimed in claim 22, wherein said step nine is performed so that transparency data of said block 3 rotated at an angle of 180 degrees is split from transparency data of said block 1 and recorded in said block 3 when block 1 and block 3 are boundary blocks and there is no overlapped pixel between said block 1 and said block 3 rotated at an angle of 180 degrees; transparency data of said block 4 rotated at an angle of 180 degrees is split from transparency data of said block 2 and recorded in said block 4 when block 2 and block 4 are boundary blocks and when there is no overlapped pixel between said block 2 and said block 4 rotated at an angle of 180 degrees.

25. The method as claimed in claim 22, wherein said twelfth step is performed so that transparency data of said block 4 rotated at an angle of 180 degrees is split from transparency data of said block 1 and recorded in said block 4 when block 1 and block 4 are boundary blocks and there is no overlapped pixel between said block 1 and said block 4 rotated at an angle of 180 degrees, and wherein the same merging step is performed with respect to said block 2 and said block 3.

26. The method as claimed in claim 23, wherein a condition for checking an overlapped pixel between two blocks when said blocks are split is determined by rotating a block at an angle of 90 degrees clockwise.

27. The method as claimed in claim 23, wherein a condition for checking an overlapped pixel between two blocks when said blocks are split is determined by rotating a block at an angle of 90 degrees counterclockwise.

28. The method as claimed in claim 23, wherein a condition for checking an overlapped pixel between two blocks when said blocks are split is determined by arranging a block symmetrically in a diagonal direction.

29. A gray scale shape data coding method for use in a method for coding gray scale shape data, said method comprising the steps of:
- merging a plurality of boundary blocks by using binary shape data of gray scale shape data when coding transparency data of the gray scale shape data, wherein said transparency data displays transparency;
- determining whether block signals are overlapped with each other; and
- merging blocks when there is no overlapped profile pixel.

30. The method as claimed in claim 29, wherein the plurality of boundary blocks are merged horizontally when said blocks are merged.

31. The method as claimed in claim 29, wherein the plurality of boundary blocks are merged vertically when said blocks are merged.

32. The method as claimed in claim 29, wherein the plurality of boundary blocks are merged diagonally when said blocks are merged.

33. The method as claimed in claim 29, wherein the merging is accomplished by sequentially merging 8×8 blocks from transparency data of the gray scale shape data of 16×16 blocks.

34. The method as claimed in claim 33, wherein before merging, the value of an exterior pixel in the plurality of boundary blocks is padded by setting said exterior pixel to a random value.

35. The method as claimed in claim 34, wherein the value of said exterior pixel of merged blocks is set to a predetermined value and re-padded.

36. The method as claimed in claim 33, wherein after padding, the value of an exterior pixel in the merged blocks is set to a predetermined value to thereby pad.

37. The method as claimed in claim 36, wherein when a first boundary block A and a second boundary block B are merged, a predetermined value for re-padding is set according to following equation and thus padded;

$$(a \times num\_a + b \times num\_b)/(num\_a + num\_b),$$

wherein:
- a is the value of the exterior pixel before merging of said block A;
- b is the value of the exterior pixel before merging of said block B;
- num_a is the number of interior pixels of said block A;
- num-b is the number of interior pixels of said block B.

38. The method as claimed in claim 36, wherein when a first boundary block A and a second boundary block B are merged, a predetermined value for re-padding by the average value is given by the equation (a+b)/2, wherein a is the value of an object before merging block A, and b is the value of an object before merging block B wherein said equation is used for padding an exterior pixel.

39. The method as claimed in claim 36, wherein before merging, the exterior pixel of the boundary blocks is padded to "0", and the value of the pixel out of object of the merge block is set to "0" and padded.

40. The method as claimed in claim 29, wherein the reproduced shape data of the binary shape data is used for the shape data.

41. A gray scale shape data coding method for use in a coding system of gray scale shape data, wherein said gray scale shape data comprises transparency data, for representing transparency, and binary shape data,
and when coding said transparency data of said gray scale shape data, and when coding a plurality of boundary blocks comprising said transparency data of said gray scale shape data by using binary shape data of the gray scale shape data, said method comprises:
(1) a horizontal merging step, comprising merging said transparency data blocks of said gray scale shape data in a horizontal direction, determining whether the blocks are overlapped with each other by using the binary shape data of the gray scale shape data of the blocks, and completing the merging when said blocks are not overlapped;
(2) a vertical merging step, comprising merging transparency data blocks of the gray scale shape data in a vertical direction, determining whether the blocks are overlapped with each other by using the binary shape data of the gray scale shape data of the blocks, and completing the merging when they are not overlapped; and
(3) a diagonal merging step, comprising merging transparency data blocks of the gray scale shape data in a diagonal direction, determining whether the blocks are overlapped with each other by using the binary shape data of the gray scale shape data of the blocks, and completing the merging when said blocks are not overlapped;
the method performing said horizontal merging step, said vertical merging step, and said diagonal merging step in a predetermined sequence, and said method performing the boundary block merging step in the unit of a 16×16 block, and completing the step without performing reset mergings when the merged blocks are generated.

42. The method as claimed in claim 41, wherein before merging, the value of an exterior pixel in the plurality of boundary blocks is set to a predetermined value to thereby pad.

43. The method as claimed in claim 42, wherein after merging, the value of the exterior pixel of merge blocks is set to a predetermined value and re-padded.

44. The method as claimed in claim 41, wherein after merging, the value of an exterior pixel in merged blocks is determined for a predetermined value to thereby pad.

45. The method as claimed in claim 44, wherein when a first boundary block A and a second boundary block B are merged, a predetermined value for re-padding is set according to following equation and thus padded;

$$(a \times num\_a + b \times num\_b)/(num\_a + num\_b);$$

wherein
- a is the value of the exterior pixel before merging of block A;
- b is the value of the exterior pixel before merging of block B;
- num-a is the number of interior pixels of said block A;
- num-b is the number of interior pixels of said block B.

46. The method as claimed in claim 44, wherein when a first boundary block A and a second boundary block B are merged, a predetermined value for the re-padding of the average value given by the equation (a+b)/2 where a is the value of an object before merging block A, and b is the value of object before merging block B, where said equation is used for padding the exterior pixel.

47. The method as claimed in claim 44, wherein before merging, when the exterior pixel of the boundary blocks is padded to "0", the value of the exterior pixel of the merge block is set to "0" and padded.

48. The method as claimed in claim 41, wherein the reproduced shape data of the binary shape data are used for the shape data.

49. A method of coding/decoding gray scale shape data for use in a coded system of gray scale shape data, wherein said gay scale shape data comprises transparency data, for representing transparency, and binary shape data, and when coding said transparency data of said gray scale shape data, and when coding a plurality of boundary blocks comprising said transparency data of said gray scale shape data by using binary shape data of the gray scale shape data, said method comprises:

a first step, said first step comprising merging the plurality of boundary blocks, determining whether the block signals are overlapped by using binary shape data of the gray scale shape data of boundary blocks, and not merging the blocks where overlapped pixels are generated; and a second step, said second step comprising determining whether there is a merged block by examining whether the signals of the binary shape data blocks of the gray scale shape data are overlapped, and thereby restoring the original block by splitting the merged block by using the binary shape data of the gray scale shape data.

50. The method as claimed in claim 49, wherein the reproduced shape data of the binary shape data are used for the shape data.

51. The method as claimed in claim 49, wherein before merging, the value of an exterior pixel in the plurality of boundary blocks is set to a predetermined value to thereby pad.

52. The method as claimed in claim 51, wherein after merging, the value of the exterior pixel of the merge blocks is set to a predetermined value and re-padded.

53. The method as claimed in claim 49, wherein after merging, the value of an exterior pixel in the merged blocks is set to a predetermined value to thereby pad.

54. The method as claimed in claim 53, wherein when a first boundary block A and a second boundary block B are merged, a predetermined value for re-padding is set according to following equation and thus padded;

$$(a \times num\_a + b \times num\_b)/(num\_a + num\_b);$$

wherein a is the value of the exterior pixel before merging of the block A;

b the value of the exterior pixel before merging of the block B;

num_a is the number of interior pixels of block A;

num-b is the number of interior pixels of block B.

55. The method as claimed in claim 53, wherein when a first boundary block A and a second boundary block B are merged, a predetermined value for re-padding of the average value is given by the equation (a+b)/2 wherein a is the value of an object before merging block A, and b is the value of an object before merging block B wherein said equation is used for padding said exterior pixel.

56. The method as claimed in claim 53, wherein before merging, when the exterior pixel of the boundary blocks is padded to "0", the value of the exterior pixel of the merge block is set to "0" and padded.

57. A gray scale shape data coding method for use in a coding system of gray scale shape data wherein said gray scale shape data comprises transparency data, for representing transparency, and binary shape data, and when coding said transparency data of said gray scale shape data, and when coding a plurality of boundary blocks comprising said transparency data of said gray scale shape data by using binary shape data of the gray scale shape data, said method comprises:

(1) a horizontal merging step, comprising merging said transparency data blocks of said gray scale shape data in a horizontal direction, determining whether the blocks are overlapped with each other by using the binary shape data of the gray scale shape data of the blocks, and completing the merging when said blocks are not overlapped;

(2) a vertical merging step said step comprising merging transparency data blocks of the gray scale shape data in a vertical direction, determining whether the blocks are overlapped with each other by using the binary shape data of the gray scale shape data of the blocks, and completing the merging when they are not overlapped; and (3) a diagonal merging step, comprising merging transparency data blocks of the gray scale shape data in a diagonal direction, determining whether the blocks are overlapped with each other by using the binary shape data of the gray scale shape data of the blocks, and completing the merging when said blocks are not overlapped;

the method performing said horizontal merging step, said vertical merging step, and said diagonal merging step in a predetermined sequence and completing said sequence without performing a rest merging when the merged blocks are generated, the method of decoding comprising:

(1) a horizontal splitting step, comprising splitting a transparency data block of the horizontal gray scale shape data block with reference to the binary shape data of the gray scale shape data of the blocks when there is no overlapped blocks after determining whether the horizontal blocks are overlapped by the binary shape data of the gray scale shape data, and restoring to the original block before merging;

(2) a vertical splitting step, comprising splitting a transparency data block of the vertical gray scale shape data block with reference to the binary shape data of the gray scale shape data of the blocks when there is no overlapped blocks after determining whether the vertical blocks are overlapped by the binary shape data of the gray scale shape data, and restoring to the original block before merging; and (3) a diagonal splitting step, comprising splitting a transparency data block of a diagonal gray scale shape data block with reference to the binary shape data of the gray scale shape data of the blocks when there is no overlapped blocks after determining whether the diagonal blocks are overlapped by using the binary shape data of the gray scale shape data, and restoring to the original block before merging;

the method performing, said horizontal splitting step, said vertical splitting step, and said diagonal splitting step in a predetermined sequence and completing said sequence without performing a rest splitting in the unit of 16×16 blocks when the split blocks are generated.

58. The method as claimed in claim 57, wherein the reproduced shape data of the binary shape data of the gray scale shape data is used for the shape data.

59. The method as claimed in claim 57, wherein before merging, the value of an exterior pixel of the plurality of boundary blocks is set to a predetermined value to thereby pad.

60. The method as claimed in claim 59, wherein when a first boundary block A and a second boundary block B are merged, a predetermined value for re-padding is determined according to following equation and thus padded;

($a$×num_$a$+$b$×num_$b$)/(num_$a$+num_$b$), wherein
- a is the value of the exterior pixel before merging of the block A;
- b is the value of the exterior pixel before merging of the block B;
- num_a is the number of interior pixels of block A;
- num_b is the number of interior pixels of block B.

61. The method as claimed in claim 59, wherein when a first boundary block A and a second boundary block B are merged, a predetermined value for the re-padding of the average value given by the equation (a+b)/2, wherein a is the value of an object before merging block A, and b is the value of an object before merging block B and wherein said equation is used for padding the exterior pixel.

62. The method as claimed in claim 59, wherein before merging, when an exterior pixel of the boundary blocks is padded to "0", the value of the exterior pixel of the merge block is determined to be "0" and padded.

63. The method as claimed in claim 59, wherein after padding, the value of the exterior pixel in the merged blocks is set to a predetermined value to thereby pad.

64. The method as claimed in claim 57, wherein the value of the exterior of the merge blocks is set to a predetermined value and re-padded.

* * * * *